(12) United States Patent
Yoshimura

(10) Patent No.: US 11,491,699 B2
(45) Date of Patent: Nov. 8, 2022

(54) EMBOSS FABRICATION APPARATUS AND EMBOSS FABRICATION METHOD

(71) Applicant: SEIREN CO., LTD., Fukui (JP)

(72) Inventor: Masaru Yoshimura, Fukui (JP)

(73) Assignee: SEIREN CO., LTD.

( * ) Notice: Subject to any disclaimer, the term of this patent is extended or adjusted under 35 U.S.C. 154(b) by 145 days.

(21) Appl. No.: 16/636,167

(22) PCT Filed: Jul. 13, 2018

(86) PCT No.: PCT/JP2018/026482
§ 371 (c)(1),
(2) Date: Feb. 3, 2020

(87) PCT Pub. No.: WO2019/031159
PCT Pub. Date: Feb. 14, 2019

(65) Prior Publication Data
US 2020/0376742 A1 Dec. 3, 2020

(30) Foreign Application Priority Data
Aug. 9, 2017 (JP) .............................. JP2017-153880

(51) Int. Cl.
*B29C 59/04* (2006.01)
*B29C 59/00* (2006.01)
(Continued)

(52) U.S. Cl.
CPC ............ *B29C 59/04* (2013.01); *B29C 59/002* (2013.01); *B29K 2101/12* (2013.01); *B29L 2031/3005* (2013.01)

(58) Field of Classification Search
CPC ..... B29C 59/04; B29C 59/002; B29C 59/046; B29K 2101/12; B29L 2031/3005
(Continued)

(56) References Cited

U.S. PATENT DOCUMENTS

| 4,272,473 A | 6/1981 | Riemersma et al. |
| 2010/0249740 A1 | 9/2010 | Miyamoto et al. |
| 2017/0334127 A1 | 11/2017 | Kitano et al. |

FOREIGN PATENT DOCUMENTS

| CN | 1111561 A | 11/1995 |
| EP | 0646451 A1 | 4/1995 |

(Continued)

OTHER PUBLICATIONS

Hara et al., EPO Machine Translation of JP 2007261202A (Year: 2007).*

(Continued)

*Primary Examiner* — Joseph S Del Sole
*Assistant Examiner* — Baileigh Kate Darnell
(74) *Attorney, Agent, or Firm* — Lerner, David, Littenberg, Krumholz & Mentlik, LLP

(57) ABSTRACT

In an emboss fabrication apparatus, an emboss roll includes, on an outer periphery, a molded portion having a concavo-convex shape. A first backup roll sandwiches, together with the emboss roll, a base material. A first heating unit heats the first backup roll. A second backup roll sandwiches, together with the emboss roll, the base material. A contact unit is provided opposite to the emboss roll in a first range. The contact unit contacts a back face of the base material.

14 Claims, 2 Drawing Sheets

(51) Int. Cl.
    *B29K 101/12* (2006.01)
    *B29L 31/30* (2006.01)
(58) Field of Classification Search
    USPC .......................................................... 264/293
    See application file for complete search history.

(56) References Cited

FOREIGN PATENT DOCUMENTS

| | | |
|---|---|---|
| JP | S4724662 B | 7/1972 |
| JP | S556754 B2 | 2/1980 |
| JP | S55111224 A | 8/1980 |
| JP | S5723036 B2 | 5/1982 |
| JP | S5723037 B2 | 5/1982 |
| JP | H0455380 B2 | 9/1992 |
| JP | H07329175 A | 12/1995 |
| JP | 200286562 A | 3/2002 |
| JP | 2004167726 A | 6/2004 |
| JP | 200798742 A | 4/2007 |
| JP | 2007261202 A | 10/2007 |
| JP | 2007276285 A | 10/2007 |
| JP | 200950538 A | 3/2009 |
| JP | 5913755 B1 | 5/2016 |
| JP | 2016159476 A | 9/2016 |

OTHER PUBLICATIONS

International Search Report for Application No. PCT/JP2018/026482, dated Aug. 28, 2018, pp. 1-3.

* cited by examiner

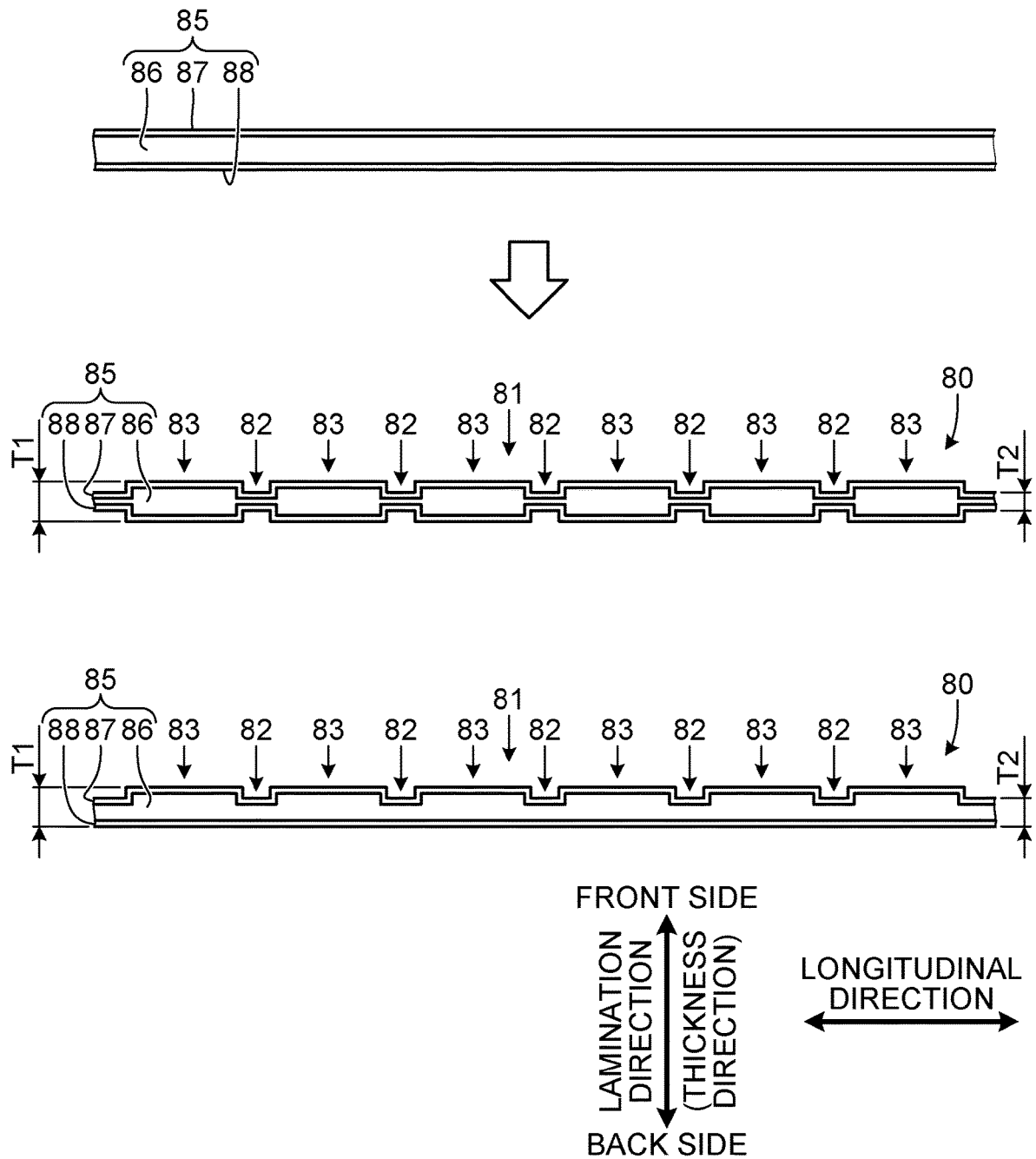

EMBOSS FABRICATION APPARATUS AND EMBOSS FABRICATION METHOD

CROSS-REFERENCE TO RELATED APPLICATIONS

This application is a national phase entry under 35 U.S.C. § 371 of International Application No. PCT/JP2018/026482 filed Jul. 13, 2018, which claims the priority from Japanese Patent Application No. 2017-153880 filed in the Japanese Patent Office on Aug. 9, 2017, the entire disclosures of which are hereby incorporated by reference herein.

TECHNICAL FIELD

The present invention relates to emboss fabrication.

BACKGROUND ART

Technologies related to emboss fabrication have been disclosed. For example, a method of manufacturing a vehicle seat-skin material having a concavo-convex pattern is disclosed in Patent Literature 1. In the manufacturing method, a lamination sheet passes between an emboss roll and a heat roll while being pressed. The emboss roll is set to a temperature of 100 to 250° C. The heat roll is set to a temperature of 100 to 250° C. A processing speed is 0.3 to 10 m/min. The manufacturing method can be performed also in a state described below. The aforementioned state is a state in which a calendar roll is disposed on a side opposite to the heat roll while contacting the emboss roll. Furthermore, the aforementioned state is a state in which the lamination sheet contacts the emboss roll across ½ of the circumference.

A sheet embossing method is disclosed in Patent Literature 2. In the aforementioned method, a sheet-shaped object is provided with pressurized embossing by an emboss roll and then forcibly peeled off. The sheet-shaped object includes a surface layer made of thermoplastic resin. The peel-off is performed in a direction at an angle of 10 to 60° toward a back roll relative to a tangent line of the emboss roll at a peeling point. Patent Literatures 3 to 7 are listed as conventional technologies in Patent Literature 2. Patent Literatures 3 to 7 are related to a method described below. The aforementioned method is a method of providing an embossing pattern to a front face of a sheet-shaped object including a porous layer by heated emboss.

An emboss carrier tape manufacturing device is disclosed in Patent Literature 8. In the emboss carrier tape manufacturing device, part of a base material resin tape on which an emboss portion is formed is cooled by heat transfer to a rotary mold and cooling air from a cooler. Accordingly, the shape of the aforementioned part is fixed. The emboss carrier tape manufacturing device includes an auxiliary roller. The auxiliary roller prevents the base material resin tape after the cooling from demolding from the rotary mold.

A method of manufacturing a seat-skin material is disclosed in Patent Literature 9. The seat-skin material is formed by providing an emboss pattern to a front face of an elongated material. The manufacturing method includes a process of pressing the elongated material. In this process, the elongated material passes between an emboss roll and a flat roll. The emboss roll is provided with a plurality of embossing portions protruding from a base surface. As the elongated material passes between the emboss roll and the flat roll, a front face fabric, a back face fabric, and a cushion material are thermally fused with each other through heating and pressing by the embossing portions. Furthermore, since the emboss roll and the flat roll are both heated, the front face fabric and the back face fabric are thermally fused with the cushion material. A thermally fused part of the cushion material becomes compressed. A concave portion is formed on the front face fabric side of the seat-skin material through heating and pressing by the embossing portions. A concave portion is formed on the back face fabric side of the seat-skin material at a position corresponding to the concave portion of the front face fabric. A seat-skin material having an emboss pattern described below is formed by emboss fabrication. The aforementioned emboss pattern is a pattern in which a plurality of concave portions are formed on the surface of the front face fabric and the surface of the back face fabric.

CITATION LIST

Patent Literature

Patent Literature 1: JP-A-2007-276285
Patent Literature 2: JP-A-H7-329175
Patent Literature 3: Japanese Patent Publication No. 47-24662
Patent Literature 4: Japanese Patent Publication No. 55-6754
Patent Literature 5: Japanese Patent Publication No. 57-23036
Patent Literature 6: Japanese Patent Publication No. 57-23037
Patent Literature 7: Japanese Patent Publication No. 4-55380
Patent Literature 8: JP-A-2004-167726
Patent Literature 9: Japanese Patent No. 5913755

SUMMARY OF INVENTION

Problems to be Solved by the Invention

A decorative sheet is practically used. The decorative sheet is a dressing sheet having a concavo-convex pattern on a front face of a base material. The base material is a sheet material having an elongated shape. The base material includes, for example, various sheet materials different from each other in one or both of thickness and material. The base material is a laminated body in some cases. When the base material is a laminated body, the base material is formed by, for example, bonding a front face material to a front face of a middle material. Alternatively, the aforementioned base material is formed by bonding a front face material to the front face of a middle material and also bonding a back face material to a back face of the middle material.

The decorative sheet is manufactured by an emboss fabrication apparatus. The inventor recognizes that a sufficient concavo-convex pattern is not shaped on the front face of the base material when emboss fabrication is performed on the front face of the base material at a manufacturing site. The inventor thinks that the aforementioned problem is likely to occur when the base material is thick. The inventor knows that it is difficult to shape a concavo-convex pattern including a concave portion described below and a convex portion adjacent to the concave portion, for example, when the base material is a laminated body in an aspect described below. The aforementioned aspect is an aspect in which a thin front face material is bonded to a front face of a thick middle material having a cushion characteristic and a thin back face material is bonded to a back face of the aforementioned middle material. The aforementioned concave portion is such a concave portion that the front face material and the back face material bonded to the front and back faces of the middle material closely contact each other. The inventor thinks that various kinds of problems occur in some cases when the aforementioned concavo-convex pattern is shaped.

For example, assume that the shaping of the concavo-convex pattern is divided into two processes. In this case, it is assumed that misalignment occurs between shaping positions of the concavo-convex pattern in the processes. Thus, the inventor discussed about an emboss fabrication technology capable of shaping the concavo-convex pattern having a desired stereoscopic shape on the front face of the base material even when the base material is a laminated body as described above. In the discussion, the inventor considered a point that the aforementioned positional misalignment can be reduced when the concavo-convex pattern is shaped through a plurality of times. The discussed emboss fabrication technology is applicable to various kinds of base materials. For example, the emboss fabrication technology is applicable not only to a base material as a laminated body of two or more layers but also to a base material of a single layer.

The present invention is intended to provide an emboss fabrication apparatus and an emboss fabrication method that can manufacture a decorative sheet having a stereoscopic concavo-convex pattern.

Solutions to Problems

An aspect of the present invention is an emboss fabrication apparatus including: an emboss roll that includes, on an outer periphery, a molded portion having a concavo-convex shape and is configured to rotate in a first rotational direction along a circumferential direction; a first backup roll provided on a first side of the emboss roll in a first disposition direction along a radial direction of the emboss roll and configured to contact a back face of a base material having an elongated shape, sandwich, together with the emboss roll, the base material while a front face of the base material is pressed against the molded portion, and rotate in a second rotational direction opposite to the first rotational direction; a first heating unit provided to the first backup roll and configured to heat the first backup roll; a second backup roll provided further on a second side of the emboss roll in the first disposition direction than the first backup roll and configured to contact the back face of the base material, sandwich, together with the emboss roll, the base material having passed between the emboss roll and the first backup roll and being conveyed on the outer periphery of the emboss roll in a conveyance direction corresponding to each of the first rotational direction and the second rotational direction while the front face of the base material is pressed against the molded portion, and rotate in the second rotational direction; and a contact unit provided opposite to the emboss roll in a first range of the outer periphery of the emboss roll and configured to contact the back face of the base material being conveyed in the conveyance direction in the first range, the first range being a range between a first position and a second position, the first position being a position where the base material passes between the emboss roll and the first backup roll, the second position being a position where the base material enters between the emboss roll and the second backup roll.

According to this emboss fabrication apparatus, peel-off (demolding) of the base material from the emboss roll while the base material is conveyed in the first range can be restricted by the contact unit. In the base material being conveyed in the first range, the amount of thermal contraction differs between sides closer to the front face and the back face. Thus, the base material is likely to peel off from the emboss roll halfway through conveyance in the first range due to the aforementioned difference in the amount of thermal contraction. When the base material being conveyed in the first range has peeled off from the emboss roll, positional misalignment between a first shaping position and a second shaping position is likely to occur. The first shaping position is a position on the front face of the base material at which pressing is performed by the emboss roll and the first backup roll. The second shaping position is a position on the front face of the base material at which pressing is performed by the emboss roll and the second backup roll. As for this point, in the above-described emboss fabrication apparatus, since peel-off of the base material from the emboss roll is restricted, the positional misalignment between the first shaping position and the second shaping position can be reduced.

In the emboss fabrication apparatus, the contact unit may be provided opposite to the emboss roll at a third position closer to the first backup roll than the second position in the first range. With this configuration, peel-off of the base material from the emboss roll can be restricted at an early timing after the base material has passed between the emboss roll and the first backup roll.

In the emboss fabrication apparatus, the contact unit may include a first contact roll provided opposite to the emboss roll at the third position and configured to rotate in the second rotational direction while contacting the back face of the base material. With this configuration, the base material can be smoothly conveyed.

In the emboss fabrication apparatus, the contact unit may include a second contact roll provided opposite to the emboss roll at a fourth position closer to the second backup roll than the third position in the first range and configured to rotate in the second rotational direction while contacting the back face of the base material. With this configuration, the base material can be smoothly conveyed while peel-off of the base material from the emboss roll is restricted at the third position and the fourth position.

The emboss fabrication apparatus may further include a guide roll provided opposite to the first backup roll in a second range of an outer periphery of the first backup roll on a fourth side opposite to a third side closer to the first range in a second disposition direction orthogonal to the first disposition direction and configured to supply, toward the first backup roll, the base material to be conveyed in the conveyance direction on the outer periphery of the first backup roll to enter between the emboss roll and the first backup roll. With this configuration, the base material can be smoothly supplied to the first backup roll. A distance by which the base material is conveyed on the outer periphery of the first backup roll can be shortened. The base material can be made closely contact the first backup roll. The base material can be smoothly heated.

The emboss fabrication apparatus may further include a second heating unit provided to the second backup roll and configured to heat the second backup roll. The emboss fabrication apparatus may further include a third heating unit provided to the emboss roll and configured to heat the emboss roll. With this configuration, the base material can be heated. Change in the temperature of the base material after the base material has passed between the emboss roll and the first backup roll can be reduced.

Another aspect of the present invention is an emboss fabrication method including: a first process of sandwiching a base material having an elongated shape between an emboss roll and a first backup roll while a molded portion of the emboss roll, which has a concavo-convex shape presses a front face of the base material and the first backup roll contacts a back face of the base material, the emboss roll including the molded portion on an outer periphery and being configured to rotate in a first rotational direction along a circumferential direction, the first backup roll being provided on a first side of the emboss roll in a first disposition direction along a radial direction of the emboss roll and configured to rotate in a second rotational direction opposite to the first rotational direction; a second process of conveying the base material having passed between the emboss roll and the first backup roll, in a conveyance direction corresponding to each of the first rotational direction and the second rotational direction in a first range of the outer periphery of the emboss roll, the first range being a range between a first position and a second position, the first position being a position where the base material passes between the emboss roll and the first backup roll, the second position being a position where the base material enters between the emboss roll and a second backup roll provided further on a second side of the emboss roll in the first disposition direction than the first backup roll and configured to rotate in the second rotational direction; and a third process of sandwiching the base material conveyed in the conveyance direction in the first range, between the emboss roll and the second backup roll while the molded portion presses the front face of the base material and the second backup roll contacts the back face of the base material, wherein the first process is performed while the first backup roll is heated by a first heating unit provided to the first backup roll, and the second process is performed while a contact unit provided opposite to the emboss roll in the first range contacts the back face of the base material.

According to this emboss fabrication method, peel-off of the base material from the emboss roll while the base material is conveyed in the first range can be restricted by the contact unit. The above-described positional misalignment between the first shaping position and the second shaping position can be reduced.

Advantageous Effects of the Invention

According to the present invention, it is possible to obtain an emboss fabrication apparatus and an emboss fabrication method that can manufacture a decorative sheet having a stereoscopic concavo-convex pattern.

BRIEF DESCRIPTION OF DRAWINGS

FIG. 2 is a side view illustrating a schematic exemplary configuration of the base material and the decorative sheet. Parts of the base material having an elongated shape and the decorative sheet having an elongated shape in the longitudinal direction thereof are illustrated. The upper part illustrates the base material. The middle part illustrates the decorative sheet having a concavo-convex pattern at a front face of the base material and having a concavo-convex shape at a back face of the base material. The lower part illustrates the decorative sheet having a concavo-convex pattern at the front face of the base material and having a planar shape at the back face of the base material.

DESCRIPTION OF EMBODIMENTS

Figure 1:
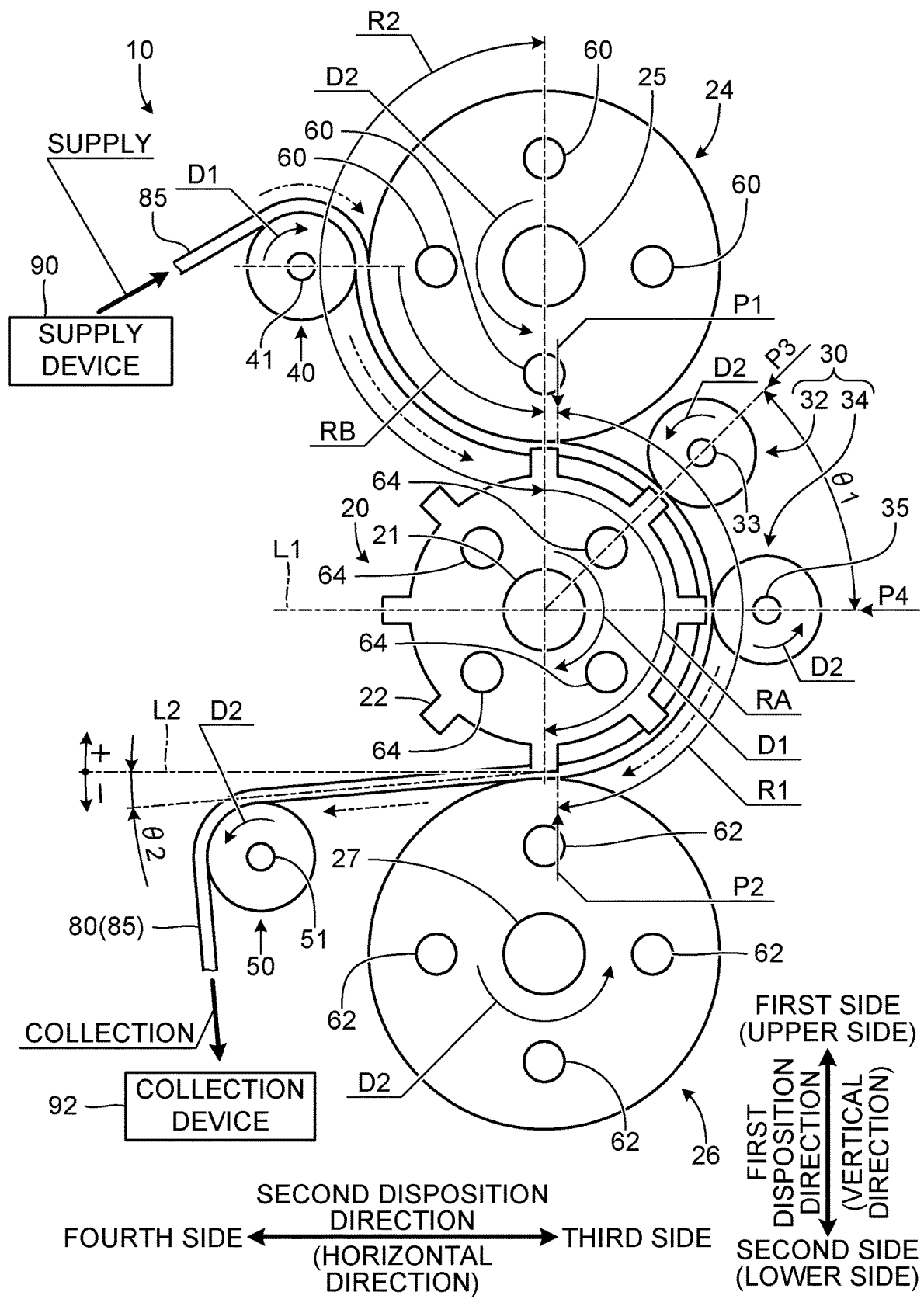
FIG. 1 is a side view illustrating a schematic exemplary configuration of an emboss fabrication apparatus. Parts of a base material and a decorative sheet corresponding to the emboss fabrication apparatus are illustrated.

An embodiment for performing the present invention will be described below with reference to the accompanying drawings. The present invention is not limited to configurations described below but may also employ various kinds of configurations in the same technical idea. For example, some of the configurations described below may be omitted or replaced with other configurations or the like. The present invention may include other configurations.

<Emboss Fabrication Apparatus and Decorative Sheet>

An emboss fabrication apparatus 10 and a decorative sheet 80 will be described below with reference to FIGS. 1 and 2. The emboss fabrication apparatus 10 is a fabrication apparatus configured to manufacture the decorative sheet 80. The emboss fabrication apparatus 10 conveys a base material 85 having an elongated shape and fed out from a supply device 90 and performs emboss fabrication on the base material 85 (refer to FIG. 1). In the emboss fabrication apparatus 10, the emboss fabrication is continuously performed. After being provided with the emboss fabrication at the emboss fabrication apparatus 10, the base material 85 is collected as the decorative sheet 80 by a collection device 92. In FIG. 1, illustration of each component described below is simplified. The aforementioned components are the base material 85, the decorative sheet 80, the supply device 90, and the collection device 92. The base material 85 and the decorative sheet 80 have the form of a sheet material having an elongated shape continuous from the supply device 90 to the collection device 92. As the supply device 90 and the collection device 92, the supply device 90 and the collection device 92 provided to a well-known emboss fabrication apparatus may be employed. Thus, description related to the supply device 90 and the collection device 92 is omitted.

The decorative sheet 80 is a dressing sheet having a concavo-convex pattern 81 at least at the front face of the base material 85 (refer to the middle and lower parts of FIG. 2). The concavo-convex pattern 81 is formed of a concave portion 82 and a convex portion 83. In the example illustrated at the middle part of FIG. 2, the decorative sheet 80 has a back face having a concavo-convex shape corresponding to the concavo-convex pattern 81 at the front face. In other words, the decorative sheet 80 has the concavo-convex pattern 81 at the front face and has, at the back face, a concavo-convex pattern corresponding to the concavo-convex pattern 81 at the front face. In the example illustrated in the lower part of FIG. 2, the decorative sheet 80 has a back face having a planar shape. In the embodiment, the concavo-convex pattern 81 is a stripe pattern having a concavo-convex shape. In the stripe pattern, the concave portion 82 and the convex portion 83 along the transverse direction of the base material 85 are repeated in the longitudinal direction of the base material 85. In the decorative sheet 80 illustrated at the middle part of FIG. 2, similarly to the concavo-convex pattern 81, the concavo-convex pattern at the back face is a stripe pattern having a concavo-convex shape. The aforementioned longitudinal direction and transverse direction are directions orthogonal to each other. The transverse direction is aligned with the width direction of the base material 85. However, such a concavo-convex pattern 81 is exemplary. In the decorative sheet 80, various concavo-convex patterns are employed as the concavo-convex pattern 81. The transverse direction of the base material 85 may be also referred to as a transverse direction of the decorative sheet 80. The longitudinal direction of the base material 85 may be also referred to as a longitudinal direction of the decorative sheet 80.

As the base material 85, various sheet materials are employed. Thus, the base material 85 includes, for example, various sheet materials different from each other in one or both of thickness and material. The base material 85 has a cushion characteristic. In the embodiment, the base material 85 is a three-layer laminated body (refer to the upper part of FIG. 2). In this case, the base material 85 includes a middle material 86, a front face material 87, and a back face material 88. However, the base material may be a laminated body of two layers or four or more layers. For example, when the base material is a two-layer laminated body, the base material may be a laminated body of the middle material 86 and the front face material 87. Alternatively, the base material does not need to be a laminated body. The base material may be a thick sheet material having a single layer and having a cushion characteristic.

In the embodiment, one side in a lamination direction is referred to as a "front side", and the other side in the lamination direction is referred to as a "back side". The lamination direction is a direction in which the front face material 87, the middle material 86, and the back face material 88 are laminated in the base material 85. The lamination direction is aligned with a thickness direction of the base material 85. In the base material 85, the front side in the lamination direction is a side on which the front face material 87 is provided, and the back side in the lamination direction is a side on which the back face material 88 is provided. In each of the sheet materials of the base material 85, the middle material 86, the front face material 87, and the back face material 88, the front face is a face on the front side in the lamination direction, and the back face is a face on the back side in the lamination direction. Through the emboss fabrication, the front face of the base material 85 becomes the front face of the decorative sheet 80, and the back face of the base material 85 becomes the back face of the decorative sheet 80.

The base material 85 is formed as follows. That is, the front face material 87 is bonded to the front face of the middle material 86. The back face material 88 is bonded to the back face of the middle material 86. A well-known technology is employed for the bonding between the middle material 86 and the front face material 87 and the bonding between the middle material 86 and the back face material 88. For example, each aforementioned bonding is performed through a bonding agent. Alternatively, each aforementioned bonding may be performed by frame laminate. The frame laminate is an already practically used technology. Thus, description related to the frame laminate is omitted.

The middle material 86 has a cushion characteristic. Thus, as described above, the base material 85 has a cushion characteristic. As the middle material 86, a urethane foam sheet is exemplified. For example, a soft urethane foam sheet is employed as the middle material 86. The thickness of the middle material 86 is determined as appropriate with various conditions taken into consideration. For example, in the determination of the thickness of the middle material 86, the cushion characteristic of the base material 85 is considered. Alternatively, in the determination of the thickness of the middle material 86, workability in the emboss fabrication is considered. When each aforementioned point is considered, the thickness of the middle material 86 is preferably, for example, a predetermined value in the range of 1 to 10 mm.

As the front face material 87, various sheet materials are employed. For example, the front face material 87 may be formed of any of woven fabric, knitted fabric, non-woven fabric, synthesis leather, artificial leather, vinyl chloride leather, and natural leather. As for the front face material 87, a sheet material is determined as appropriate with various conditions taken into consideration. However, for the workability in the emboss fabrication, the front face material 87 is preferably a sheet material containing thermoplastic resin. As the back face material 88, various sheet materials are employed. For example, the back face material 88 may be formed of any of woven fabric, knitted fabric, and non-woven fabric. As for the back face material 88, a sheet material is determined as appropriate with various conditions taken into consideration. The workability in the emboss fabrication can be improved by providing the back face material 88 to the base material 85.

The emboss fabrication apparatus 10 includes an emboss roll 20, a first backup roll 24, a second backup roll 26, a contact unit 30, a guide roll 40, a peel-off roll 50, a first heating unit 60, a second heating unit 62, and a third heating unit 64 (refer to FIG. 1).

The emboss roll 20 includes, on the outer periphery, a molded portion 22 having a concavo-convex shape. The molded portion 22 contacts the front face of the base material 85 and presses the front face of the base material 85. The concavo-convex shape of the molded portion 22 corresponds to the concavo-convex pattern 81 at the front face of the decorative sheet 80. The emboss roll 20 rotates in a first rotational direction D1 with a shaft 21 as a rotational axis. The first rotational direction D1 corresponds to the circumferential direction of the emboss roll 20. The emboss roll 20 is provided with drive power from a drive unit. Accordingly, the emboss roll 20 rotates as aforementioned. The drive unit is attached to the shaft 21. The drive unit is, for example, a motor. In FIG. 1, illustration of the drive unit is omitted. In the embodiment, a direction opposite to the first rotational direction D1 is referred to as a "second rotational direction D2".

The first backup roll 24 rotates in the second rotational direction D2 with a shaft 25 as a rotational axis. The first backup roll 24 is provided on a first side of the emboss roll 20 in a first disposition direction. The first disposition direction is a direction along the radial direction of the emboss roll 20. In the embodiment, the first disposition direction is aligned with the vertical direction. The first side in the first disposition direction is the upper side in the vertical direction. The first backup roll 24 contacts the back face of the base material 85. The first backup roll 24 together with the emboss roll 20 sandwiches the base material 85. In this case, the front face of the base material 85 is pressed against the molded portion 22. The first backup roll 24 is driven by rotation of the emboss roll 20 in the first rotational direction D1 and rotates in the second rotational direction D2.

The second backup roll 26 rotates in the second rotational direction D2 with a shaft 27 as a rotational axis. The second backup roll 26 is provided further on a second side of the emboss roll 20 in the first disposition direction than the first backup roll 24. When the first side in the first disposition direction is the upper side in the vertical direction, the second side in the first disposition direction is the lower side in the vertical direction. In the embodiment, the second backup roll 26 is provided at a position where a conveyance range RA is ½ of the circumference of the outer periphery of the emboss roll 20. The conveyance range RA is a range in which the base material is conveyed in a conveyance direction on the outer periphery of the emboss roll 20. Thus, the first backup roll 24, the emboss roll 20, and the second backup roll 26 are sequentially disposed in the first disposition direction. The conveyance direction is a direction corresponding to each of the first rotational direction D1 and the second rotational direction D2. In the emboss fabrication apparatus 10, the base material 85 and the decorative sheet after the emboss fabrication are conveyed in the conveyance direction. In FIG. 1, an arrow illustrated with a dashed and double-dotted line indicates the conveyance direction. The second backup roll 26 contacts the back face of the base material 85. The second backup roll 26 together with the emboss roll 20 sandwiches the base material 85 described below. In this case, the front face of the base material 85 is pressed against the molded portion 22. The aforementioned base material 85 is a base material having passed between the emboss roll 20 and the first backup roll 24 and being conveyed in the conveyance direction on the outer periphery of the emboss roll 20. The second backup roll 26 is driven by rotation of the emboss roll 20 in the first rotational direction D1 and rotates in the second rotational direction D2.

The contact unit 30 is provided opposite to the emboss roll 20 in a first range R1 of the outer periphery of the emboss roll 20. The first range R1 is a range of a first position P1 to a second position P2 on the outer periphery (entire circumference) of the emboss roll 20. The first position P1 and the second position P2 are positions on the outer periphery of the emboss roll 20 as described below. That is, the first position P1 is a position where the base material 85 passes between the emboss roll 20 and the first backup roll 24. The second position P2 is a position where the base material 85 enters between the emboss roll 20 and the second backup roll 26. In the embodiment, the first range R1 is part of the outer periphery of the emboss roll 20 on a third side in a second disposition direction. The second disposition direction is a direction orthogonal to the first disposition direction. When the first disposition direction is the vertical direction, the second disposition direction is the horizontal direction. The contact unit 30 contacts the back face of the base material 85 being conveyed in the conveyance direction in the first range R1. The contact unit 30 includes a first contact roll 32 and a second contact roll 34. The first contact roll 32 and the second contact roll 34 may be each a roll provided with a cover layer on the outer periphery. As a cover material forming the cover layer, felt is exemplified. In the first contact roll 32 and the second contact roll 34, the contact area of the back face of the base material 85 can be increased along with deformation of a felt layer on the outer periphery. However, the cover material may be a material different from felt. The cover material is determined as appropriate with various conditions taken into consideration.

The first contact roll 32 rotates in the second rotational direction D2 with a shaft 33 as a rotational axis. The first contact roll 32 is provided opposite to the emboss roll 20 at a third position P3 in the first range R1. The third position P3 is a position closer to the first backup roll 24 than the second backup roll 26 in the first range R1. In other words, the third position P3 is a position closer to the first backup roll 24 than the second position P2 in the first range R1. In the embodiment, the third position P3 is on the first side of a reference line L1 in the first disposition direction (the upper side in the vertical direction). Furthermore, the third position P3 is a position where an angle θ1 is 45°. The reference line L1 is a straight line passing through the rotation center of the emboss roll 20 in the second disposition direction. When the first disposition direction is the vertical direction, the second disposition direction is the horizontal direction, and thus the reference line L1 is a horizontal line. The angle θ1 is an angle to the reference line L1 with respect to the rotation center of the emboss roll 20. The angle of 45° as the angle θ1 is exemplary. The angle θ1 only needs to have a predetermined value with which the third position P3 is a position closer to the first backup roll 24 than the second position P2 in the first range R1. The angle θ1 is determined as appropriate with various conditions taken into consideration.

The first contact roll 32 contacts the back face of the base material 85 at the third position P3 in the first range R1. The first contact roll 32 together with the emboss roll 20 sandwiches the base material 85. The first contact roll 32 is driven to rotate in the second rotational direction D2 while contacting the back face of the base material 85. The first contact roll 32 presses the base material 85 toward the center of the emboss roll 20 in the radial direction. In this pressing, pressing force is generated by the weight of the first contact roll 32. However, the pressing of the base material 85 may be performed as follows. For example, the emboss fabrication apparatus 10 is provided with a predetermined actuator. The actuator moves the first contact roll 32 toward the center of the emboss roll 20 in the radial direction. Accordingly, the first contact roll 32 presses the base material 85 toward the center of the emboss roll 20 in the radial direction. As the actuator, a well-known actuator is employed. As the well-known actuator, an air cylinder, a hydraulic pressure cylinder, or an electric cylinder is exemplified.

The second contact roll 34 rotates in the second rotational direction D2 with a shaft 35 as a rotational axis. The second contact roll 34 is provided opposite to the emboss roll 20 at a fourth position P4 in the first range R1. The fourth position P4 is a position closer to the second backup roll 26 than the third position P3 in the first range R1. In the embodiment, the fourth position P4 is a position on the reference line L1. The fourth position P4 is determined as appropriate with taken into consideration the relation with the third position P3. The second contact roll 34 contacts the back face of the base material 85 at the fourth position P4 in the first range R1. The second contact roll 34 together with the emboss roll 20 sandwiches the base material 85. The second contact roll 34 is driven to rotate in the second rotational direction D2 while contacting the back face of the base material 85. The second contact roll 34 may press the base material 85 toward the center of the emboss roll 20 in the radial direction. In this pressing, pressing force may be provided by a predetermined configuration. For example, the emboss fabrication apparatus 10 may be provided with a predetermined actuator. The actuator moves the second contact roll 34 toward the center of the emboss roll 20 in the radial direction. Accordingly, the second contact roll 34 presses the base material 85 toward the center of the emboss roll 20 in the radial direction. The actuator is as described above.

The guide roll 40 rotates in the first rotational direction D1 with a shaft 41 as a rotational axis. The guide roll 40 is provided opposite to the first backup roll 24 in a second range R2 of the outer periphery of the first backup roll 24. The second range R2 is a range of the outer periphery (entire circumference) of the first backup roll 24 on a fourth side in the second disposition direction. In the embodiment, the guide roll 40 is provided at a position where a conveyance range RB is ¼ of the circumference of the first backup roll 24. The conveyance range RB is a range in which the base material 85 is conveyed in the conveyance direction on the outer periphery of the first backup roll 24. The guide roll 40 supplies the base material 85 toward the first backup roll 24.

The guide roll 40 together with the first backup roll 24 sandwiches the base material 85. The base material 85 passes between the first backup roll 24 and the guide roll 40. Furthermore, the base material 85 is conveyed in the conveyance direction on the outer periphery (the conveyance range RB) of the first backup roll 24. Thereafter, the base material 85 enters between the emboss roll 20 and the first backup roll 24. The guide roll 40 is driven to rotate in the first rotational direction D1 while the outer periphery thereof contacts the front face of the base material 85.

The peel-off roll 50 rotates in the second rotational direction D2 with a shaft 51 as a rotational axis. The decorative sheet 80 is hanged over the peel-off roll 50. In the emboss fabrication apparatus 10, the base material 85 becomes the decorative sheet 80 by passing between the emboss roll 20 and the second backup roll 26. The peel-off roll 50 is driven to rotate in the second rotational direction D2 while the outer periphery thereof contacts the back face of the decorative sheet 80. The decorative sheet 80 is conveyed from a position between the emboss roll 20 and the second backup roll 26 toward the peel-off roll 50. Accordingly, the peel-off roll 50 peels off (demolds) the decorative sheet 80 from the emboss roll 20. The peel-off roll 50 is provided at a predetermined position on the fourth side of the second backup roll 26 in the second disposition direction at which the conveyance direction is a direction described below. The aforementioned direction is a direction in which an angle θ2 is formed relative to a tangent line L2 of the emboss roll 20. The aforementioned tangent line L2 is a tangent line on the second side in the first disposition direction among two tangent lines of the emboss roll 20 in the second disposition direction. The angle θ2 preferably has a predetermined value in the range of −10 to 45°. The angle θ2 is determined as appropriate with various conditions taken into consideration. In the embodiment, as for the angle θ2, the clockwise direction is defined as "+", and the anticlockwise direction is defined as "−". In the emboss fabrication apparatus 10, the angle θ2 is set to be −5°.

The first heating unit 60 is provided to the first backup roll 24. The first heating unit 60 is embedded inside the first backup roll 24. The first heating unit 60 is an electric heater. In the embodiment, the four first heating units 60 as electric heaters are embedded at equally spaced angles in the first backup roll 24. However, each first heating unit 60 may be a heating unit of a type different from an electric heater. The number of first heating units 60 may be three or less or may be five or more. The type of each first heating unit 60 and the number thereof are determined as appropriate with various conditions taken into consideration. Disposition of the first heating units 60 in the first backup roll 24 is determined as appropriate with various conditions taken into consideration. The first heating units 60 heat the first backup roll 24. For example, the first heating units 60 heat the first backup roll 24 to a predetermined temperature in the range of 150 to 240° C.

The second heating unit 62 is provided to the second backup roll 26. The second heating unit 62 is embedded inside the second backup roll 26. The second heating unit 62 is an electric heater. In the embodiment, the four second heating units 62 as electric heaters are embedded at equally spaced angles in the second backup roll 26. However, each second heating unit 62 may be a heating unit of a type different from an electric heater. The number of second heating units 62 may be three or less or may be five or more. The type of each second heating unit 62 and the number thereof are determined as appropriate with various conditions taken into consideration. Disposition of the second heating units 62 in the second backup roll 26 is determined as appropriate with various conditions taken into consideration. The second heating units 62 heat the second backup roll 26. For example, the second heating units 62 heat the second backup roll 26 to a predetermined temperature in the range of 150 to 240° C.

The third heating unit 64 is provided to the emboss roll 20. The third heating unit 64 is embedded inside the emboss roll 20. The third heating unit 64 is an electric heater. In the embodiment, the four third heating units 64 as electric heaters are embedded at equally spaced angles in the emboss roll 20. However, each third heating unit 64 may be a heating unit of a type different from an electric heater. The number of third heating units 64 may be three or less or may be five or more. The type of each third heating unit 64 and the number thereof are determined as appropriate with various conditions taken into consideration. Disposition of the third heating units 64 in the emboss roll 20 is determined as appropriate with various conditions taken into consideration. The third heating units 64 heat the emboss roll 20. For example, the third heating units 64 heat the emboss roll 20 to a predetermined temperature in the range of 150 to 240° C.

When the temperature of each of the first backup roll 24, the second backup roll 26, and the emboss roll 20 is lower than 150° C., a shaping characteristic thereof is spoiled in some cases. When the temperature of each of the first backup roll 24, the second backup roll 26, and the emboss roll 20 exceeds 240° C., the thickness of the base material 85 decreases in some cases. As a result, in the decorative sheet 80, the quality of the concavo-convex pattern 81 is spoiled in some cases, or a cushion characteristic thereof is spoiled in some cases.

<Emboss Fabrication Method>

An emboss fabrication method will be described below with reference to FIGS. 1 and 2. The emboss fabrication method is performed by the emboss fabrication apparatus 10 (refer to FIG. 1). The decorative sheet 80 illustrated at the middle or lower part of FIG. 2 is manufactured from the base material 85 illustrated at the upper part of FIG. 2 by the emboss fabrication method. Thus, the emboss fabrication method is also a method of manufacturing the decorative sheet 80. The emboss fabrication method includes a first process, a second process, and a third process. In the emboss fabrication method, the first process, the second process, and the third process are sequentially and continuously performed while the base material 85 is continuously conveyed in the conveyance direction. The first process is continuously performed on the base material 85 being continuously conveyed. The second process is continuously performed on the base material 85 being continuously conveyed. The third process is continuously performed on the base material 85 being continuously conveyed. In the emboss fabrication apparatus 10, when the emboss fabrication method is performed, the drive unit for the emboss roll 20 continuously drives.

In the emboss fabrication method, the concave portion 82 and the convex portion 83 having predetermined dimensions in the lamination direction are shaped (formed) on the front face of the base material 85 by two times of pressing on the base material 85 (refer to FIG. 2). The first heating units 60 heat the first backup roll 24. The second heating units 62 heat the second backup roll 26. The third heating units 64 heat the emboss roll 20. That is, the emboss fabrication method is performed in a state in which the first backup roll 24, the emboss roll 20, and the second backup roll 26 are each heated to the corresponding predetermined temperature.

In the supply device 90, the base material 85 is fed out and supplied to the emboss fabrication apparatus 10 (refer to FIG. 1). In the emboss fabrication apparatus 10, the base material 85 is conveyed in the conveyance direction on the outer periphery of the guide roll 40 and passes between the first backup roll 24 and the guide roll 40. Thereafter, the base material 85 is conveyed in the conveyance direction on the outer periphery of the first backup roll 24 while the back face thereof contacts the outer periphery of the first backup roll 24. The base material 85 is heated by the first backup roll 24 at the predetermined temperature before the emboss fabrication method is performed.

The first process is a process of sandwiching the base material 85 between the emboss roll 20 and the first backup roll 24 in a state described below. The aforementioned state is a state in which the molded portion 22 presses the front face of the base material 85 and the first backup roll 24 contacts the back face of the base material 85. The emboss roll 20 rotates in the first rotational direction D1. The first backup roll 24 is driven to rotate in the second rotational direction D2. In the first process, the first pressing on the base material 85 is performed.

The second process is a process of conveying the base material 85 described below in the conveyance direction in the first range R1. The aforementioned base material 85 is a base material having passed through between the emboss roll 20 and the first backup roll 24. The second process is performed while the first contact roll 32 and the second contact roll 34 contact the back face of the base material 85. The emboss roll 20 rotates in the first rotational direction D1. In the contact unit 30, the first contact roll 32 and the second contact roll 34 are driven to rotate in the second rotational direction D2. The base material 85 passes between the emboss roll 20 and the first contact roll 32 and further passes between the emboss roll 20 and the second contact roll 34. Thereafter, the base material 85 is conveyed in the conveyance direction on the outer periphery of the emboss roll 20.

The third process is a process of sandwiching the base material 85 described below between the emboss roll 20 and the second backup roll 26 in a state described below. The aforementioned base material 85 is a base material conveyed in the conveyance direction in the first range R1 of the outer periphery of the emboss roll 20. The aforementioned state is a state in which the molded portion 22 presses the front face of the base material 85 and the second backup roll 26 contacts the back face of the base material 85. The emboss roll 20 rotates in the first rotational direction D1. The second backup roll 26 is driven to rotate in the second rotational direction D2. In the third process, the second pressing on the base material 85 is performed.

After the third process ends, the decorative sheet 80 is peeled off from the emboss roll 20 by the peel-off roll 50. Thereafter, the decorative sheet 80 is collected from the emboss fabrication apparatus 10 by the collection device 92. In the decorative sheet 80 illustrated at the middle part of FIG. 2, the back face has a concavo-convex shape corresponding to the concavo-convex pattern 81 at the front face. However, even when the emboss fabrication method is performed as described above by the emboss fabrication apparatus 10, the back face of the decorative sheet 80 has a planer planar shape unlike the middle part of FIG. 2 in some cases (refer to the lower part of FIG. 2). Whether the back face of the decorative sheet 80 has a concavo-convex shape (refer to the middle part of FIG. 2) or a planer planar shape (refer to the lower part of FIG. 2) is determined based on, for example, a point described below. The aforementioned point is characteristics of some or all of materials of the middle material 86, the front face material 87, and the back face material 88. For example, when the back face material 88 is a material difficult to extend and having large thermal contraction, the back face of the decorative sheet 80 has a planer planar shape in some cases (refer to the lower part of FIG. 2). Assume that the first backup roll 24 and the second backup roll 26 each have an outer periphery as a flat curved surface (refer to FIG. 1). In this case, a fact that, in the emboss fabrication, the back face of the base material 85 deforms into a concavo-convex shape like the decorative sheet 80 illustrated at the middle part of FIG. 2 is a well-known phenomenon (refer to Patent Literature 9 described above, for example).

EXAMPLE

The inventor performed an experiment to check effectiveness of the decorative sheet 80 manufactured by the emboss fabrication method performed by the emboss fabrication apparatus 10 of the embodiment. The following describes an experiment result obtained through the experiment. In the description, for clear correspondence to the above description, the reference sign of each component is same as that described above.

(1) Experiment Method

In the experiment, Samples 1 to 3 were evaluation targets. The base material 85 was identical between Samples 1 to 3. The base material 85 was a three-layer laminated body (refer to the upper part of FIG. 2). The middle material 86, the front face material 87, and the back face material 88 were bonded by frame laminate. The middle material 86, the front face material 87, and the back face material 88 were described below.

[Middle Material, Front Face Material, and Back Face Material]

Middle material 86 (material, thickness): soft urethane foam sheet, 5 mm

Front face material 87 (material, basis weight): polyester knitted fabric, 300 g/m$^2$ Back face material 88 (material, basis weight): polyester non-woven fabric, 12 g/m$^2$ In Samples 1 to 3, the concavo-convex pattern 81 at the front face was same as the stripe pattern (refer to the middle or lower part of FIG. 2) exemplified in the embodiment. Thus, the concavo-convex pattern 81 had a configuration in which the concave portion 82 and the convex portion 83 were repeated in the longitudinal direction of the base material 85. Sample 1 corresponds to the decorative sheet 80 of the embodiment. A production condition of Sample 1 was as described below. As for the production condition, first pressing force is pressure applied to the base material 85 when the base material 85 passes between the emboss roll 20 and the first backup roll 24. Second pressing force is pressure applied to the base material 85 when the base material 85 passes between the emboss roll 20 and the second backup roll 26. In the emboss fabrication apparatus 10 used to produce Sample 1, the angle θ2 was −5° (refer to FIG. 1).

[Production Condition of Sample 1]

Processing speed: 1 m/min

First backup roll 24 (temperature, conveyance range RB): 240° C., ¼ of the circumference Emboss roll 20 (temperature, conveyance range RA): 180° C., ½ of the circumference First pressing force: 40 MPa Second backup roll 26 (temperature): 210° C.

Second pressing force: 40 MPa

An emboss fabrication apparatus not including the contact unit 30 (the first contact roll 32 and the second contact roll 34) was used to produce Sample 2. An emboss fabrication apparatus not including the second backup roll 26 was used to produce Sample 3. Production conditions of Samples 2 and 3 were same as that of the above-described Sample 1 except that the different emboss fabrication apparatuses were used. Thus, other description related to the production conditions of Samples 2 and 3 is omitted.

(2) Evaluation

Evaluation items were four items: shaping position misalignment due to the two times of pressing, the thicknesses of Samples 1 to 3, a height difference ΔT between the concave portion 82 and the convex portion 83, and durability of the concavo-convex pattern 81.

(2-1) Shaping Position Misalignment

Evaluation of shaping position misalignment was performed by visual observation of Samples 1 to 3. An evaluation criterion was as described below.

[Evaluation Criterion for Shaping Position Misalignment]

A: no shaping position misalignment was observed

B: shaping position misalignment was observed

In the above-described evaluation criterion, Evaluation "A" indicates that a first pitch and a second pitch matches with the shape of the concavo-convex molded portion 22 in the circumferential direction of the emboss roll 20. On the other hand, evaluation "B" indicates that the first pitch and the second pitch do not match with the shape of the concavo-convex molded portion 22 in the circumferential direction of the emboss roll 20. The first pitch is the pitch of the concave portions 82 in the longitudinal direction. The second pitch is the pitch of the convex portions 83 in the longitudinal direction.

(2-2) Thicknesses of Samples 1 to 3

A thickness T1 (refer to the middle or lower part of FIG. 2) of each of Samples 1 to 3 was measured. The position of the measurement was the position of the convex portion 83. As described above, the thickness of the middle material 86 was 5 mm in the state of being the base material 85 (state before the emboss fabrication). Thus, in Samples 1 to 3, the thickness T1 after the emboss fabrication is preferably equal to or larger than 5 mm.

(2-3) Height Difference Between Concave Portion and Convex Portion

A thickness T2 (refer to the middle or lower part of FIG. 2) of each of Samples 1 to 3 was measured. The position of the measurement was the position of the concave portion 82. Thereafter, the height difference AT between the concave portion 82 and the convex portion 83 was calculated from Expression (1) below. In Samples 1 to 3, the height difference ΔT is preferably equal to or larger than 3 mm.

$$\text{Height difference } \Delta T = \text{Thickness } T1 - \text{Thickness } T2 \quad (1)$$

(2-4) Durability of Concavo-Convex Pattern

Evaluation of the durability of the concavo-convex pattern 81 was performed while Samples 1 to 3 in a state described below were fixed to a plane abrasion tester (T-type) manufactured by DAIEI KAGAKU SEIKI MFG. CO., LTD. The aforementioned state is a state in which urethane foam in a size described below is attached to the back face. The aforementioned size includes the width of 70 mm, the length of 300 mm, and the thickness of 10 mm. A test condition and an evaluation criterion were as described below.

[Test Condition]

Friction element surface shape: curved surface (10R) and cotton cloth (cotton canvas) attachment Load: 9.8 N Stroke: 140 mm Friction reciprocation speed: 60 reciprocation/min The number of times of reciprocation: 10,000 times

[Evaluation Criterion for Durability of Concavo-Convex Pattern]

A: no change of the concavo-convex pattern 81 was observed

B: Slight change of the concavo-convex pattern 81 was observed

C: Clear change of the concavo-convex pattern 81 was observed (3) Experiment Result An experiment result listed in Table 1 was obtained for each above-described evaluation of Samples 1 to 3.

TABLE 1

| EVALUATION ITEM | SAMPLE 1 | SAMPLE 2 | SAMPLE 3 |
|---|---|---|---|
| SHAPING POSITION MISALIGNMENT | A | B | A |
| THICKNESS T1 (mm) | 5.2 | 5.2 | 5.5 |
| HEIGHT DIFFERENCE ΔT (mm) | 4.2 | 3.3 | 1.6 |
| DURABILITY | A | A | C |

It was checked by comparison of Sample 1 and Sample 2 that the contact unit 30 (the first contact roll 32 and the second contact roll 34) is effective for shaping position misalignment in the emboss fabrication. In Sample 3 as well, similarly to Sample 1, no shaping position misalignment was observed. However, in Sample 3, the number of times of pressing was one in the emboss fabrication. Thus, in Sample 3, no shaping position misalignment occurred. It was checked by comparison of Sample 1 and Samples 2 and 3 that the two times of pressing in the emboss fabrication is effective. That is, according to the emboss fabrication method performed by the emboss fabrication apparatus 10 of the embodiment, the concavo-convex pattern 81 excellent in stereoscopic appearance and durability can be shaped on the front face of the base material 85.

<Effects of Embodiment>

According to the embodiment, it is possible to obtain effects as follows.

(1) In the emboss fabrication apparatus 10, the first backup roll 24 is provided on the first side of the emboss roll 20 in the first disposition direction, and the second backup roll 26 is provided on the second side of the emboss roll 20 in the first disposition direction than the first backup roll 24 (refer to FIG. 1). The first backup roll 24 is provided with the first heating unit 60. The first heating unit 60 heats the first backup roll 24. The emboss fabrication apparatus 10 includes the contact unit 30. The contact unit 30 is provided in the first range R1 of the outer periphery of the emboss roll 20. The contact unit 30 includes the first contact roll 32 and the second contact roll 34. The first contact roll 32 is provided opposite to the emboss roll 20 at the third position P3 in the first range R1. The second contact roll 34 is provided opposite to the emboss roll 20 at the fourth position P4 in the first range R1. While the emboss fabrication method is performed, the first contact roll 32 and the second contact roll 34 contact the back face of the base material 85 being conveyed in the conveyance direction in the first range R1. The first contact roll 32 and the second contact roll 34 are driven to rotate in the second rotational direction D2 while contacting the back face of the base material 85.

Thus, peel-off of the base material 85 from the emboss roll 20 while the base material 85 is conveyed in the first range R1 can be restricted by the contact unit 30 (the first contact roll 32 and the second contact roll 34). In the base material 85 being conveyed in the first range R1, the amount of thermal contraction differs between sides closer to the front face and the back face. For example, the amount of thermal contraction on the back face side is larger than the amount of thermal contraction on the front face side in some cases. Thus, the base material 85 is likely to peel off from the emboss roll 20 halfway through conveyance in the first range R1 due to the aforementioned difference in the amount of thermal contraction. When the base material 85 being conveyed in the first range R1 has peeled off from the emboss roll 20, positional misalignment between a first shaping position and a second shaping position is likely to occur. The first shaping position is a position on the front face of the base material 85 at which pressing is performed by the emboss roll 20 and the first backup roll 24. The second shaping position is a position on the front face of the base material 85 at which pressing is performed by the emboss roll 20 and the second backup roll 26. As for this point, in the emboss fabrication apparatus 10, since peel-off of the base material 85 from the emboss roll 20 is restricted, the positional misalignment between the first shaping position and the second shaping position can be reduced. Peel-off of the base material 85 from the emboss roll 20 can be restricted at an early timing after the base material 85 has passed between the emboss roll 20 and the first backup roll 24. The base material 85 can be smoothly conveyed while peel-off of the base material 85 from the emboss roll 20 is restricted at the third position P3 and the fourth position P4. In the emboss fabrication apparatus 10, the conveyance speed of the base material 85 can be increased by the two times of pressing on the base material when the emboss fabrication method is performed. Productivity of the decorative sheet 80 can be improved. The decorative sheet 80 including the stereoscopic concavo-convex pattern 81 can be manufactured.

(2) In the emboss fabrication apparatus 10, the guide roll 40 is provided opposite to the first backup roll 24 in the second range R2 (refer to FIG. 1). The guide roll 40 supplies, toward the first backup roll 24, the base material fed out from the supply device 90. Thus, the base material 85 can be smoothly supplied to the first backup roll 24. A distance by which the base material 85 is conveyed on the outer periphery of the first backup roll 24 can be shortened. The base material 85 can be made closely contact the first backup roll 24. The base material 85 can be smoothly heated.

(3) In the emboss fabrication apparatus 10, the third heating unit 64 is provided to the emboss roll 20, and the second heating unit 62 is provided to the second backup roll 26 (refer to FIG. 1). Thus, the base material 85 can be heated while the emboss fabrication method is performed. Change in the temperature of the base material 85 after the base material 85 has passed between the emboss roll 20 and the first backup roll 24 can be reduced.

<Modifications>

The embodiment may be performed as follows. Some configurations of modifications described below may be combined as appropriate and employed. The following describes any point different from the above description, and description of any identical point is omitted as appropriate.

(1) In the emboss fabrication apparatus 10, the first disposition direction is aligned with the vertical direction (refer to FIG. 1). The first disposition direction may be any direction along the radial direction of the emboss roll 20. In the emboss fabrication apparatus, the first backup roll 24, the emboss roll 20, and the second backup roll 26 may be sequentially disposed in a direction aligned with the radial direction of the emboss roll 20 and tilted relative to the vertical direction. In the emboss fabrication apparatus, which direction along the radial direction of the emboss roll 20 the first disposition direction is aligned with is determined as appropriate with various conditions taken into consideration.

(2) In the emboss fabrication apparatus 10, the second backup roll 26 is provided at a position where the conveyance range RA is ½ of the circumference of the outer periphery of the emboss roll 20 (refer to FIG. 1). The second backup roll 26 may be provided at a position different from the aforementioned position. However, the second backup roll 26 is preferably provided at a position where the conveyance range RA has a predetermined value in the range of ½ to ¾ of the circumference of the outer periphery of the emboss roll 20. When the conveyance range RA is smaller than ½ of the circumference of the outer periphery of the emboss roll 20, a shaping characteristic of the base material 85 is spoiled in some cases. On the other hand, when the conveyance range RA exceeds ¾ of the circumference of the outer periphery of the emboss roll 20, the base material 85 is excessively heated in some cases. When the base material 85 is excessively heated, the thickness T1 (refer to the lower or middle part of FIG. 2) in the state of being the decorative sheet 80 decreases in some cases. The position of the second backup roll 26 relative to the emboss roll 20 is determined as appropriate with various conditions taken into consideration.

(3) The contact unit 30 includes the first contact roll 32 and the second contact roll 34 (refer to FIG. 1). In the contact unit, the number of contact rolls may be one or may be three or more. When the number of contact rolls is one, the single contact roll is preferably provided at a position closer to the first backup roll 24 than the second backup roll 26 in the first range R1 of the outer periphery of the emboss roll 20. In such disposition, the base material 85 can be pressed toward the center of the emboss roll 20 in the radial direction by the weight of the contact roll. However, some contact rolls or all contact rolls may be provided at positions closer to the second backup roll 26 than the first backup roll 24 in the first range R1. When the contact unit includes one or a plurality of contact rolls, contact roll disposition in the first range R1 is determined as appropriate with various conditions taken into consideration.

Alternatively, the contact unit may have a configuration different from the configuration including a contact roll. For example, the contact unit may have a configuration involving no rotation along with contact with the back face of the base material 85. In addition, the contact unit may have a configuration in which the contact unit planarly contacts the back face of the base material 85 even when the contact unit is not deformed. For example, the contact unit may have a configuration in which the contact unit has a curved surface along the outer periphery of the emboss roll 20.

(4) In the emboss fabrication apparatus 10, the guide roll 40 is provided in the second range R2 of the outer periphery of the first backup roll 24 (refer to FIG. 1). Furthermore, the guide roll 40 is provided at a position where the conveyance range RB is ¼ of the circumference of the outer periphery of the first backup roll 24. The guide roll 40 may be provided at a position different from the aforementioned position. However, the guide roll 40 is preferably provided at a position where the conveyance range RB has a predetermined value in the range of ⅙ to ¾ of the circumference of the outer periphery of the first backup roll 24. When the conveyance range RB is smaller than ⅙ of the outer periphery of the first backup roll 24, the shaping characteristic of the base material 85 is spoiled in some cases. On the other hand, when the conveyance range RB exceeds ¾ of the circumference of the outer periphery of the first backup roll 24, the base material 85 is excessively heated in some cases. When the base material 85 is excessively heated, the thickness T1 (refer to the lower or middle part of FIG. 2) in the state of being the decorative sheet 80 decreases in some cases. The position of the guide roll 40 relative to the first backup roll 24 is determined as appropriate with various conditions taken into consideration.

(5) In the emboss fabrication apparatus 10, the drive unit is attached to the shaft 21 of the emboss roll 20. The emboss roll 20 spins in the first rotational direction D1 by drive power from the drive unit (refer to FIG. 1). No drive unit is provided to the first backup roll 24, the second backup roll 26, the first contact roll 32, the second contact roll 34, the guide roll 40, and the peel-off roll 50. Thus, the first backup roll 24, the second backup roll 26, the first contact roll 32, the second contact roll 34, and the peel-off roll 50 are driven to rotate in the second rotational direction D2 while contacting the back face of the base material 85. The guide roll 40 is driven to rotate in the first rotational direction D1 while contacting the front face of the base material 85. Drive units may be provided to some or all of the first backup roll 24, the second backup roll 26, the first contact roll 32, the second contact roll 34, the guide roll 40, and the peel-off roll 50. Each drive unit is, for example, a motor. Assume that drive units are provided to a plurality of rolls among the emboss roll 20, the first backup roll 24, the second backup roll 26, the first contact roll 32, the second contact roll 34, the guide roll 40, and the peel-off roll 50. In this case, a detector is preferably provided to each drive unit. When the drive unit is a motor, the detector is, for example, an encoder. The drive unit is controlled in accordance with a detection signal from the detector. Some or all of the plurality of drive units are operated in synchronization. When drive units are provided to some or all of the first backup roll 24, the second backup roll 26, the first contact roll 32, the second contact roll 34, the guide roll 40, and the peel-off roll 50, the drive unit for the emboss roll 20 may be omitted.

DESCRIPTION OF REFERENCE SIGNS 10 emboss fabrication apparatus
20 emboss roll
21 shaft
22 molded portion
24 first backup roll
25 shaft
26 second backup roll
27 shaft
30 contact unit
32 first contact roll
33 shaft
34 second contact roll
35 shaft
40 guide roll
41 shaft
50 peel-off roll
51 shaft
60 first heating unit
62 second heating unit
64 third heating unit
80 decorative sheet
81 concavo-convex pattern
82 concave portion
83 convex portion
85 base material
86 middle material
87 front face material
88 back face material
90 supply device
92 collection device
D1 first rotational direction
D2 second rotational direction
L1 reference line
L2 tangent line
P1 first position
P2 second position
P3 third position
P4 fourth position
R1 first range
R2 second range
RA, RB conveyance range
T1, T2 thickness
θ1, θ2 angle

The invention claimed is:

1. An emboss fabrication apparatus comprising:
an emboss roll that includes, on an outer periphery, a molded portion having a concavo-convex shape and is configured to rotate in a first rotational direction along a circumferential direction;
a first backup roll provided on a first side of the emboss roll in a first disposition direction along a radial direction of the emboss roll and configured to contact a back face of a base material having an elongated shape, sandwich, together with the emboss roll, the base material while a front face of the base material is pressed against the molded portion, and rotate in a second rotational direction opposite to the first rotational direction;
a first compact heater provided to the first backup roll and configured to heat the first backup roll;
a second backup roll provided further on a second side of the emboss roll in the first disposition direction than the first backup roll and configured to contact the back face of the base material, sandwich, together with the emboss roll, the base material having passed between the emboss roll and the first backup roll and being conveyed on the outer periphery of the emboss roll in a conveyance direction corresponding to each of the first rotational direction and the second rotational direction while the front face of the base material is pressed against the molded portion, and rotate in the second rotational direction; and
a first contact roll provided opposite to the emboss roll in a first range of the outer periphery of the emboss roll and configured to contact the back face of the base material being conveyed in the conveyance direction in the first range, the first range being a range between a first position and a second position, the first position being a position where the base material passes between the emboss roll and the first backup roll, the second position being a position where the base material enters between the emboss roll and the second backup roll,
a guide roll provided opposite to the first backup roll and configured to contact the front face of the base material while the base material passes directly between the guide roll and the first backup roll in a second range of an outer periphery of the first backup roll, the guide roll configured to supply, toward the first backup roll, the base material to be conveyed in the conveyance direction on the outer periphery of the first backup roll to enter between the emboss roll and the first backup roll,
wherein a linear axis aligned with the first disposition direction passes through the emboss roll, the first backup roll and the second backup roll, and
wherein the guide roll is on a first side of the linear axis and the first contact roll is on a second side of the linear axis opposite the first side such that the guide roll is separated from the first contact roll by the first backup roll.

2. The emboss fabrication apparatus according to claim 1, wherein the first contact roll is provided opposite to the emboss roll at a third position closer to the first backup roll than the second position in the first range.

3. The emboss fabrication apparatus according to claim 2, wherein the first contact roll is provided opposite to the emboss roll at the third position and configured to rotate in the second rotational direction while contacting the back face of the base material.

4. The emboss fabrication apparatus according to claim 3, further comprising a second contact roll provided opposite to the emboss roll at a fourth position closer to the second backup roll than the third position in the first range and configured to rotate in the second rotational direction while contacting the back face of the base material.

5. The emboss fabrication apparatus according to claim 4, further comprising a second compact heater provided to the second backup roll and configured to heat the second backup roll.

6. The emboss fabrication apparatus according to claim 4, further comprising a third compact heater provided to the emboss roll and configured to heat the emboss roll.

7. The emboss fabrication apparatus according to claim 3, further comprising a second compact heater provided to the second backup roll and configured to heat the second backup roll.

8. The emboss fabrication apparatus according to claim 3, further comprising a third compact heater provided to the emboss roll and configured to heat the emboss roll.

9. The emboss fabrication apparatus according to claim 2, further comprising a second compact heater provided to the second backup roll and configured to heat the second backup roll.

10. The emboss fabrication apparatus according to claim 2, further comprising a third compact heater provided to the emboss roll and configured to heat the emboss roll.

11. The emboss fabrication apparatus according to claim 1, further comprising a second compact heater provided to the second backup roll and configured to heat the second backup roll.

12. The emboss fabrication apparatus according to claim 11, further comprising a third compact heater provided to the emboss roll and configured to heat the emboss roll.

13. The emboss fabrication apparatus according to claim 1, further comprising a third compact heater provided to the emboss roll and configured to heat the emboss roll.

14. An emboss fabrication method, the method providing the emboss fabrication apparatus according to claim 1, the method further comprising:
a first process of sandwiching the base material having an elongated shape between the emboss roll and the first backup roll while the molded portion of the emboss roll, which has a concavo-convex shape presses the front face of the base material and the first backup roll contacts the back face of the base material, the emboss roll including the molded portion on the outer periphery of the emboss roll and being configured to rotate in the first rotational direction along a circumferential direction, the first backup roll being provided on the first side of the emboss roll in the first disposition direction along a radial direction of the emboss roll and configured to rotate in the second rotational direction opposite to the first rotational direction;
a second process of conveying the base material having passed between the emboss roll and the first backup roll in a conveyance direction corresponding to each of the first rotational direction and the second rotational direction in the first range of the outer periphery of the emboss roll between the first position and the second position, the second backup roll provided further on the second side of the emboss roll in the first disposition direction than the first backup roll and configured to rotate in the second rotational direction; and
a third process of sandwiching the base material conveyed in the conveyance direction in the first range, between the emboss roll and the second backup roll while the molded portion presses the front face of the base material and the second backup roll contacts the back face of the base material, wherein
the first process is performed while the first backup roll is heated by the first compact heater provided to the first backup roll, and
the second process is performed while the first contact roll provided opposite to the emboss roll in the first range contacts the back face of the base material.

* * * * *